UNITED STATES PATENT OFFICE.

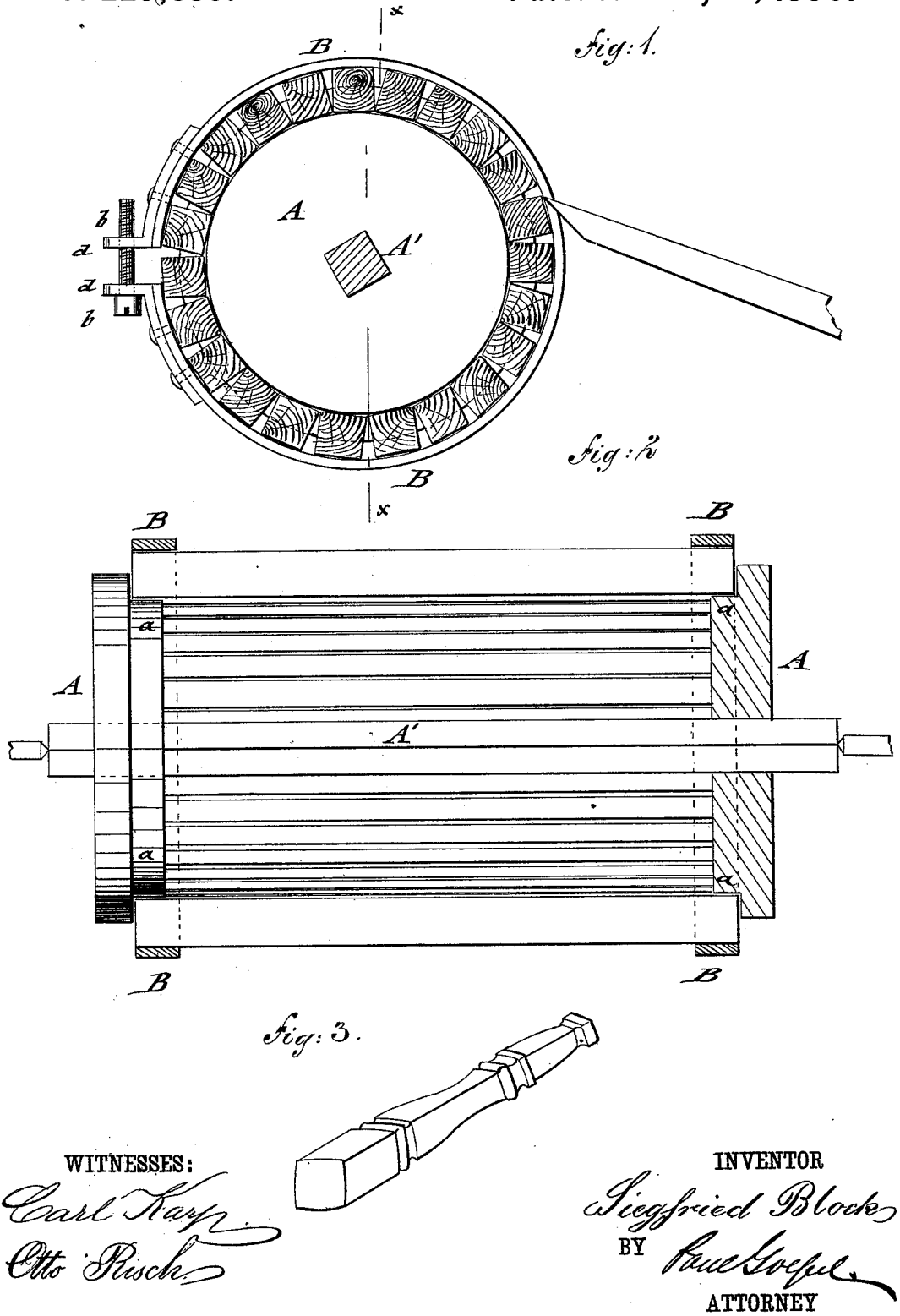

SIEGFRIED BLOCK, OF BOSTON, MASSACHUSETTS.

LATHE-CHUCK FOR TURNING POLYGONAL BODIES.

SPECIFICATION forming part of Letters Patent No. 229,855, dated July 13, 1880.

Application filed April 20, 1880. (No model.)

*To all whom it may concern:*

Be it known that I, SIEGFRIED BLOCK, of Boston, in the county of Suffolk and State of Massachusetts, have invented certain new and useful Improvements in Lathe-Chucks for Turning Polygonal Bodies, of which the following is a specification.

In the accompanying drawings, Figure 1 represents a vertical transverse section; Fig. 2, a vertical longitudinal section, on line $x\,x$, Fig. 1, of my improved lathe-chuck for turning irregular bodies; and Fig. 3 is a perspective view of an angular body turned on the lathe-chuck.

Similar letters of reference indicate corresponding parts.

This invention relates to an improved lathe-chuck for turning angular bodies of any desired profile or configuration; and it consists of two adjustable heads or disks with inner annular shoulders and of exterior tightening-bands, by which the objects to be turned are firmly secured to the heads.

Referring to the drawings, A A are two heads or disks, of any suitable size, according to the size of the objects to be turned. Either one or both of these heads are made adjustable on the center spindle, $A'$, so as to be placed nearer to or farther from each other. Each head A is provided at the inside with an annular shoulder, $a$, upon which the objects to be turned are supported. If square or oblong bodies have to be turned, they rest directly upon the shoulders of the heads, while in the case of triangular or polygonal bodies the shoulders have to be notched or recessed, so as to correspond to the angle of the bodies. Before the objects are placed in position on the disks they are first cut into triangular, square, or other shape, then placed sidewise of each other upon the shoulders of the heads, after which the heads are tightly applied to the ends of the bodies by shifting them upon the spindle, the bodies being finally clamped firmly to the heads by exterior metallic rings or bands B B, which are connected by clamp-screws $b\,b$ passing through projecting end lugs, $d\,d$, of the rings. The spindle $A'$ is placed on the lathe-centers and the entire cylindrical or drum-shaped body revolved by the same, the proper profile being given to all the pieces thereon by means of a cutting-knife, which is guided along a pattern-profile of the desired shape in the customary manner in wood-turning. After the outer side of all the pieces is thus cut to the desired profile, the clamping-bands are loosened and the pieces turned so as to bring the second side outermost, when they are secured again to the heads and the profile turned at that side. This operation is continued until all the sides are turned off and regular bodies of triangular, square, or polygonal shape obtained. The sides are slightly convex; but this does not detract from the appearance of the article. On the contrary it improves the same. The ends of the pieces which were covered by the clamping-bands, are finally turned off in the shape of tenons, which are required in most cases, as in railings, chair legs and rounds, table-legs, &c.

The bodies can thus be turned in a quicker and cheaper manner than round articles, while their angular shape is in most cases preferable to the latter.

I am aware that lathes for turning polygonal bodies in which rotating cylinders are employed are well known and have been patented heretofore; but they are of complicated construction, while my invention forms a part of the common lathe, and can be used therewith without the least difficulty.

Having thus described my invention, I claim as new and desire to secure by Letters Patent—

In a lathe-chuck for turning polygonal bodies, the combination of the revolving spindle, laterally-adjustable heads having interior annular shoulders for supporting the bodies, and exterior bands or rings for clamping the work to said heads, substantially as set forth.

In testimony that I claim the foregoing as my invention I have signed my name, in presence of two witnesses, this 7th day of April, 1880.

SIEGFRIED BLOCK.

Witnesses:
ERNST W. F. NATTER,
PAUL GOEPEL.